(12) United States Patent
Zabaleta Maeztu et al.

(10) Patent No.: US 9,559,523 B2
(45) Date of Patent: Jan. 31, 2017

(54) MULTILEVEL ELECTRONIC POWER CONVERTER

(75) Inventors: Mikel Zabaleta Maeztu, Sarriguren (ES); Jesús López Taberna, Pamplona (ES); Eduardo Burguete Archel, Pamplona (ES)

(73) Assignee: INGETEAM POWER TECHNOLOGY, S.A., Zamudio (Biskaia) (ES)

( * ) Notice: Subject to any disclaimer, the term of this patent is extended or adjusted under 35 U.S.C. 154(b) by 234 days.

(21) Appl. No.: 14/114,622

(22) PCT Filed: Apr. 29, 2011

(86) PCT No.: PCT/ES2011/070309
§ 371 (c)(1),
(2), (4) Date: Jan. 17, 2014

(87) PCT Pub. No.: WO2012/146792
PCT Pub. Date: Nov. 1, 2012

(65) Prior Publication Data
US 2014/0132068 A1   May 15, 2014

(51) Int. Cl.
*H02M 7/487* (2007.01)
*H02J 4/00* (2006.01)
*H02M 7/483* (2007.01)

(52) U.S. Cl.
CPC .......... *H02J 4/00* (2013.01); *H02M 7/483* (2013.01); *H02M 7/487* (2013.01); *Y10T 307/367* (2015.04)

(58) Field of Classification Search
CPC ............ H02M 7/42; H02M 7/44; H02M 7/48; H02M 7/483; H02M 7/487; H02M 7/49; H02M 7/537; H02M 7/5387
(Continued)

(56) References Cited

U.S. PATENT DOCUMENTS

| 5,737,201 A | 4/1998 | Meynard et al. |
| 6,031,738 A * | 2/2000 | Lipo ............... H02M 7/487 363/37 |

(Continued)

FOREIGN PATENT DOCUMENTS

| EP | 0 555 432 B1 | 10/1995 |
| EP | 1 673 849 A1 | 6/2006 |

(Continued)

OTHER PUBLICATIONS

International Search Report and Written Opinion issued in International Application No. PCT/ES2011/070309 dated Oct. 24, 2012.

*Primary Examiner* — Timothy J Dole
*Assistant Examiner* — Ivan Laboy Andino
(74) *Attorney, Agent, or Firm* — Sughrue Mion, PLLC

(57) ABSTRACT

The invention is a multilevel electronic DC/AC or AC/DC power converter for n output voltage levels with a positive branch (POS) with a positive DC voltage terminal (2), a negative branch (NEG) with a negative DC voltage terminal (1), and an AC voltage terminal (3) connected to the positive branch (POS) and to the negative branch (NEG), DC bus capacitors (4) interconnected between positive (2) and negative (1) DC voltage terminals and an intermediate DC voltage terminal (5) connected between the two DC bus capacitors (4); a plurality of first external controlled semiconductors (6) and second external controlled semiconductors (7) and, at least, one high-current DC capacitor (11), at least two high-frequency and low-current capacitors (12) and one intermediate controlled semiconductor (8) connected between the intermediate DC voltage terminal (5) and an intermediate terminal (10) of an internal branch (INT) connected in parallel with each high-current DC capacitor (11).

13 Claims, 2 Drawing Sheets

(58) Field of Classification Search
USPC ............ 363/16–17, 34–43, 95–98, 131–132, 363/135–136
See application file for complete search history.

(56) References Cited

U.S. PATENT DOCUMENTS

| | | | |
|---|---|---|---|
| 6,480,403 B1 | 11/2002 | Bijlenga | |
| 7,292,460 B2 | 11/2007 | Barbosa et al. | |
| 2006/0245216 A1* | 11/2006 | Wu ...................... | H02M 7/487 363/13 |
| 2007/0025126 A1* | 2/2007 | Barbosa ................ | H02M 7/483 363/60 |
| 2007/0235293 A1 | 10/2007 | Steimer et al. | |
| 2008/0315859 A1* | 12/2008 | Ponnaluri ............. | H02M 7/487 323/351 |
| 2009/0231896 A1 | 9/2009 | Barbosa et al. | |
| 2011/0013438 A1* | 1/2011 | Frisch .................... | H02M 7/48 363/131 |

FOREIGN PATENT DOCUMENTS

| | | |
|---|---|---|
| EP | 1 051 799 B1 | 7/2008 |
| EP | 2 080 262 B1 | 3/2010 |
| EP | 1 815 586 B1 | 10/2013 |

\* cited by examiner

US 9,559,523 B2

MULTILEVEL ELECTRONIC POWER CONVERTER

TECHNICAL FIELD OF THE INVENTION

The present invention is comprised in the technical field of electronic power converters with a plurality of levels in the output voltage and high current-carrying capacity.

BACKGROUND OF THE INVENTION

Electronic converters are widely used in power-generating applications, such as, for example in wind power generators. The desired requirements of a converter include obtaining an output current with the best THD (Total Harmonic Distortion) possible and obtaining a high voltage to minimize conduction losses.

Today, most manufacturers of electronic conversion stages are trying to increase the power thereof by increasing the number of voltage levels in the output voltage. This not only increases the power used but it also improves the quality of the current delivered, greatly reducing the harmonic content.

The two previous objectives can be achieved by means of using multilevel converters. These converters are capable of working with different voltage levels in order to obtain an output current with the best THD possible, i.e., with the best wave quality possible. They are also capable of increasing the working voltage which is a desirable characteristic in order to obtain fewer losses.

A large amount of multilevel conversion topologies like those described in patent documents EP0555432A1, EP1051799B1, EP1673849A1, EP1815586A1, EP2080262B1, is known in the state of the art even though most of them involve an excessively complicated and expensive electromechanical design.

A multilevel converter providing the previous characteristics is the converter described in EP0555432A1. This converter is formed by n cells made up of a capacitor and two semiconductors that are connected in series, one after another. The increase of the voltage levels available is done by means of adding the voltages to or subtracting the voltages from the capacitors. However, this converter has the problem of having a large size and high cost which greatly complicates the electromechanical design. The need of this large size limits the number of levels attainable by this converter since there will come a time when the volume required makes it non-viable.

EP1051799B1 proposes a multilevel converter formed by a converter of the NPC (Neutral Point Clamped) type in which clamp diodes are replaced with ANPC (Active Neutral Point Clamped) controlled semiconductors in the output stage of which capacitors are intercalated for the purpose of increasing available voltage levels. The main problem of the converter described in EP1051799B1 is that in order to obtain an n-level converter, it is necessary to serialize (n−1)/2 controlled semiconductors.

EP1673849A1 describes a multilevel converter formed from the serialization of several switching units, each of these made up of two controlled semiconductors arranged in series through a capacitor. The main problem that this converter has is that in switches there are parasitic inductances causing unwanted voltage surges such that it reduces the current capacity and the service life of the semiconductors. EP1815586A1 has tried to mitigate this phenomenon by means of a circuit using semiconductors and additional voltage limiter circuits. These additional elements increase the cost and size and they add complexity to the converter.

EP2080262B1 proposes a converter similar to that of EP1673849A1 in which additional semiconductors are introduced for the purpose of reducing the number of capacitors necessary and increasing the number of levels. These additional semiconductors also increase the cost and size and they add complexity to the converter.

DESCRIPTION OF THE INVENTION

The object of the present invention is to overcome the drawbacks of the state of the art detailed above by means of a multilevel electronic DC/AC or AC/DC power converter for n output voltage levels with a positive branch with a positive DC voltage terminal, a negative branch with a negative DC voltage terminal, and an AC voltage terminal connected to the positive branch and to the negative branch; at least two DC bus capacitors interconnected between the positive DC voltage terminal and the negative DC voltage terminal, and an intermediate DC voltage terminal connected between the two DC bus capacitors; a plurality of first external controlled semiconductors with antiparallel diodes connected in series in the negative branch between the negative DC voltage terminal and the AC voltage terminal, and a plurality of second external controlled semiconductors with antiparallel diodes connected in series in the positive branch between the positive DC voltage terminal and the AC voltage terminal; comprising at least two first external controlled semiconductors and at least two second external controlled semiconductors;

at least one high-current DC capacitor connected between the positive branch and the negative branch, and at least two high-frequency low-current capacitors connected between the positive branch and the negative branch;

an internal branch connected in parallel with each high-current DC capacitor comprising at least two internal controlled semiconductors with antiparallel diodes connected in series between them and to an intermediate terminal;

at least one intermediate controlled semiconductor formed by two controlled semiconductors with antiparallel diodes and connected in anti-series, connected between the intermediate DC voltage terminal and the intermediate terminal of the internal branch.

From this configuration it results that the intermediate semiconductors, which are connected at one end to the intermediate DC voltage terminal and at the other end to the intermediate terminal of the internal branch, are introduced in the n-level converter of the present invention. These new intermediate semiconductors introduced allow a distinct operation of the converter, providing redundancies that can be used so that the output current of the converter only circulates through one of the capacitors connected between the positive branch and the negative branch, such that the size of the rest can be reduced and solving the problem of the converter described in EP0555432A1. A first preferred embodiment comprises n−1 first external controlled semiconductors and n−1 second external controlled semiconductors. A second preferred embodiment comprises n−3 internal controlled semiconductors. The first preferred embodiment and the second preferred embodiment can be used together. Thus, for n voltage levels of the n−1 capacitors that would be connected between the positive and negative branches, only (n−3)/2 of the capacitors must be sized for all the output current of the converter, whereas (n+1)/2 of the capacitors would aid in fixing the cut-off voltage of the semiconductors and will be of help in the switching dead times. An electronic power converter with n or more levels in the output voltage with a reduced number of high-current capacitors and semiconductors is thereby obtained.

In a preferred embodiment of the invention, each high-frequency low-current capacitor is connected to the positive branch between two first external controlled semiconductors and to the negative branch between two second external controlled semiconductors. According to this embodiment, the high-frequency low-current capacitors are connected consecutively and each high-current DC capacitor is connected to the negative branch between two first external controlled semiconductors and to the positive branch between two second external controlled semiconductors.

It is also preferable that the internal branch can be connected to said positive and negative branches between the high-frequency low-current capacitor closest to the AC voltage terminal and the high-current DC capacitor closest to the voltage terminals.

In an embodiment of the multilevel electronic converter, the latter has five output levels and comprises two intermediate controlled semiconductors controlled with antiparallel diodes and connected in anti-series between the intermediate terminal and intermediate DC voltage terminal, four first external controlled semiconductors connected in series in the negative branch and four second external controlled semiconductors connected in series in the positive branch, a high-current DC capacitor connected between the positive branch and the negative branch, as well as two high-frequency low-current capacitors connected between the positive branch and the negative branch.

In another embodiment of the multilevel electronic converter, the latter has seven output levels and comprises four internal controlled semiconductors connected in series in the internal branch, an intermediate controlled semiconductor formed by two semiconductors with antiparallel diodes and connected in anti-series between the intermediate terminal and the intermediate DC voltage terminal, six first external controlled semiconductors connected in series in the negative branch and six second external controlled semiconductors connected in series in the positive branch, two high-current DC capacitors connected between the positive branch and the negative branch, as well as three high-frequency low-current capacitors connected between the positive branch and the negative branch.

According to the invention, the converter can further comprise at least one first complementary high-frequency low-current capacitor connected between the negative branch and the internal branch and at least one second complementary high-frequency low-current capacitor connected between the positive branch and the internal branch. These complementary high-frequency low-current capacitors are preferably interconnected between the internal branch and said positive and negative branches between one of the high-frequency low-current capacitors and a high-current DC capacitor. The incorporation of such complementary high-frequency low-current capacitors is especially suitable for more than five-level converters. Thus, in an alternative embodiment of the seven output-level converter, the latter comprises four internal controlled semiconductors connected in series in the internal branch, an intermediate controlled semiconductor formed by two semiconductors with antiparallel diodes and connected in anti-series between the intermediate terminal and the intermediate DC voltage terminal, six first external controlled semiconductors connected in series in the negative branch and six second external controlled semiconductors connected in series in the positive branch, two high-current DC capacitors connected between the positive branch and the negative branch, only two high-frequency low-current capacitors connected between the positive branch and the negative branch as well as a first complementary high-frequency low-current capacitor connected between the negative branch and the internal branch, and a second complementary high-frequency low-current capacitor connected between the positive branch and the internal branch.

According to this seven-level alternative embodiment, the complementary high-frequency low-current capacitors can be interconnected between the internal branch and said positive and negative branches, between the high-frequency low-current capacitor closest to the AC voltage terminal and the high-current DC capacitor closest to the voltage terminals, the internal branch being connected therein to said positive and negative branches between the complementary high-frequency low-current capacitors and the high-current DC capacitor closest to the voltage terminals.

The controlled semiconductors can be IGBT (Isolated Gate Bipolar Transistor) transistors, IGCT (Integrated Gate Controlled Thyristor) thyristors, IEGT (Injection Enhanced Gate Transistor) transistors, GTO (Gate Turn-Off Thyristor) thyristors and any combination thereof.

The controlled semiconductors of the converter according to the present invention can be controlled by means of a PWM (pulse-width modulation) strategy which allows synthesizing an alternating voltage in the AC terminal by means of a pulse-width modulation control system to synthesize an alternating voltage in the AC terminal. In addition, to keep the voltage of the intermediate DC voltage terminal and the voltage of each of the high-current DC capacitors stable, the converter can be provided with a voltage stabilizing system using redundancies available in output voltage vectors of the converter. To reduce the losses in the converter and thus increase the efficiency of the system, the semiconductors closest to the DC bus could be semiconductors having low conduction losses, such as, for example IGCT, GTO type semiconductors, etc., since these will switch to the frequency of the fundamental AC.

The multilevel electronic power converter according to the present invention described above can be especially integrated into wind turbine conversion stages such that the present invention also relates to a conversion stage for a wind turbine, characterized in that it comprises a multilevel electronic converter such as the one previously described in general and according to any of its embodiments.

As inferred from the above, the present invention achieves its objective by means of a converter which reduces the number of high-current capacitors to less than half, and it has considerable advantages in its size, design, cost, operation, control and attainable levels.

BRIEF DESCRIPTION OF THE DRAWINGS

Aspects and embodiments of the invention are described below based on several drawings in which the following has been depicted in illustrative but non-limiting manner.

Figure 1:
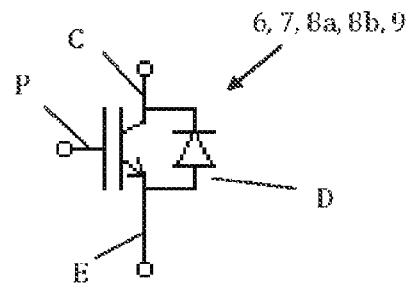
FIG. 1 shows an example of a controlled semiconductor used in the power converter according to the present invention.

Reference numbers identifying the following elements are shown in these figures:

1 negative DC voltage terminal
2 positive DC voltage terminal
3 AC voltage terminal
4 DC bus capacitor
5 intermediate DC voltage terminal
6 first external controlled semiconductor
8 intermediate controlled semiconductor
8a, 8b controlled semiconductors connected in anti-series
9 internal controlled semiconductor
10 intermediate terminal
11 high-current DC capacitor
12 high-frequency low-current capacitor
13 first complementary capacitor
14 second complementary capacitor
C collector
E emitter
P port
POS positive branch
NEG negative branch

EMBODIMENTS OF THE INVENTION

Figure 2:
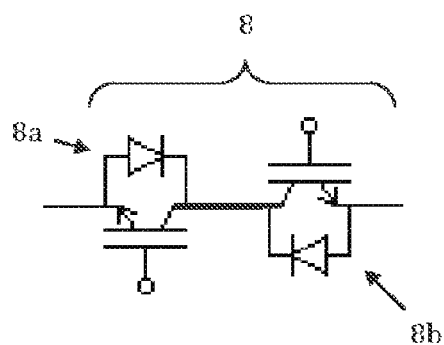
FIG. 2 shows an example of an intermediate semiconductor, made up of two semiconductors as depicted in FIG. 1 with their antiparallel diodes and connected in anti-series.

FIG. 1 shows a conventional IGBT type semiconductor which can be used as an external semiconductor -6, 7- or internal semiconductor -9- in the multilevel electronic power converter according to the present invention. It comprises a collector -C-, a port -P-, an emitter -E- and a diode -D-. As can be seen in FIG. 2, two semiconductors -8a, 8b- as shown in FIG. 1 connected in anti-series and with their antiparallel diodes can form an intermediate controlled semiconductor -8- forming part of the power converter.

Figure 3:
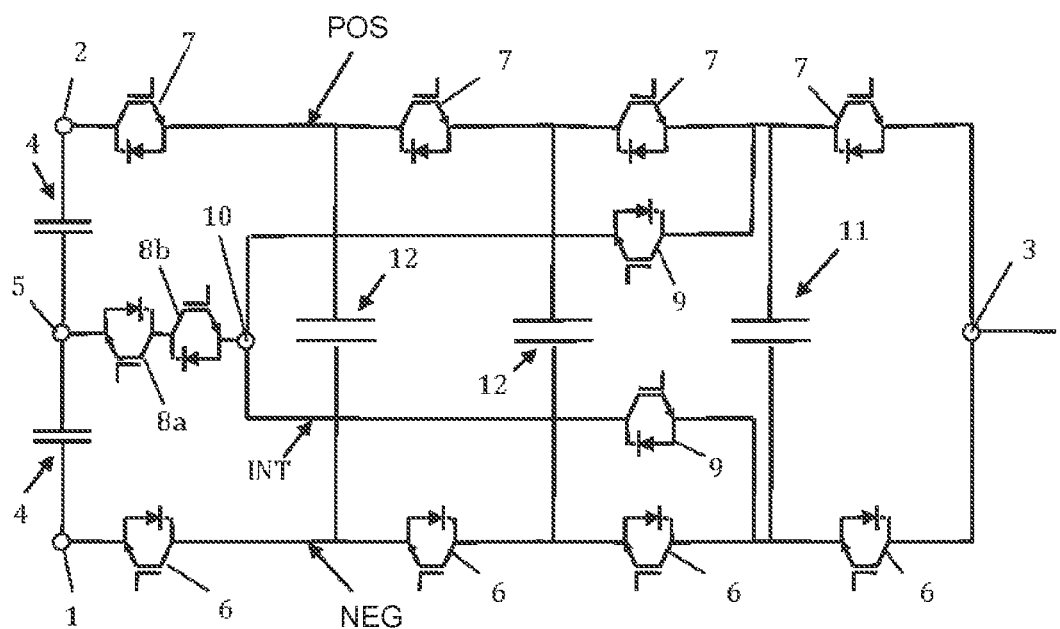
FIG. 3 shows a preferred embodiment of the invention for the case of a 5-level converter.

FIG. 3 shows an embodiment of a multilevel electronic converter with five output levels comprising a positive branch -POS- with a positive DC voltage terminal -2-, a negative branch -NEG- with a negative DC voltage terminal -1-, and an AC voltage terminal -3- connected to the positive branch -POS- and to the negative branch -NEG-. Two DC bus capacitors -4- are connected between the positive DC voltage terminal -2- and negative DC voltage terminal -1- and there is an intermediate DC voltage terminal -5- connected between the two DC bus capacitors -4-. In addition, four first external controlled semiconductors -6- with their antiparallel diodes are connected in series between the negative DC voltage terminal -1- and the AC voltage terminal -3- in the negative branch -NEG-, whereas a plurality of second external controlled semiconductors -7- with their antiparallel diodes are connected in series in the positive branch -POS- between the positive DC terminal -2- and the AC voltage terminal -3-.

A high-current capacitor -11- on the side of the AC voltage terminal 3 and two high-frequency low-current capacitors -12- on the side of the DC voltage terminals -1, 2, 5- are connected between the positive branch -POS- and the negative branch -NEG-. The high-current DC capacitor 11 is connected to the negative NEG between two first external controlled semiconductors 6 and to the positive branch POS between two second external controlled semiconductors 7. Each of the high-frequency low-current capacitors -12- is in turn connected to the negative branch NEG between two first external controlled semiconductors 6 and to the positive branch POS between two second external controlled semiconductors 7.

The converter also has an internal branch -INT- connected in parallel with the high-current DC capacitor -11- with two internal controlled semiconductors -9- with its antiparallel diodes, connected in series between them and to an intermediate terminal -10-. The semiconductor -8- shown in FIG. 2, i.e., the intermediate controlled semiconductor -8- formed by the two controlled semiconductors -8a, 8b- with their antiparallel diodes and connected in anti-series, is connected between the intermediate terminal -10- and the intermediate DC voltage terminal -5-.

Figure 4A:
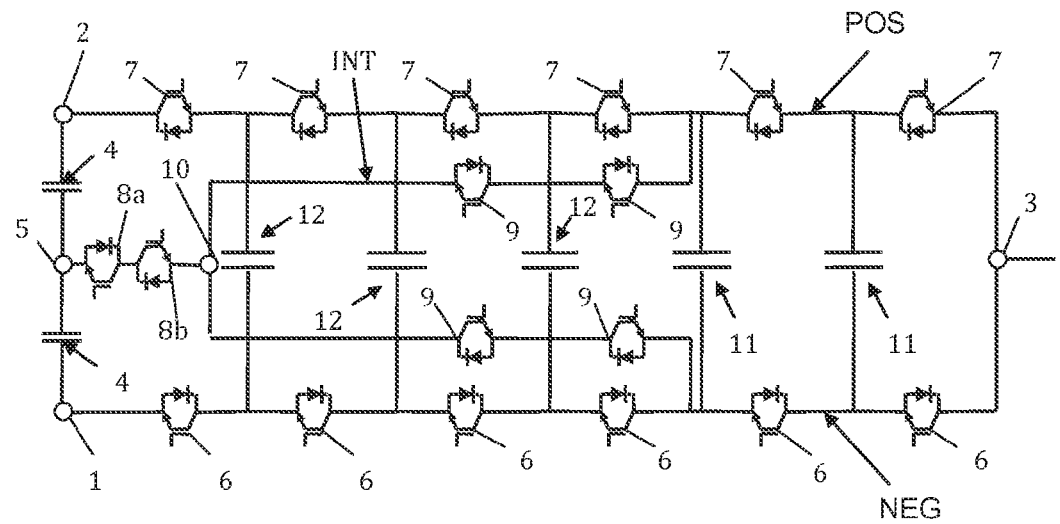
FIGS. 4A and 4B show two preferred embodiments of the invention for the case of a 7-level converter.
Figure 4B:
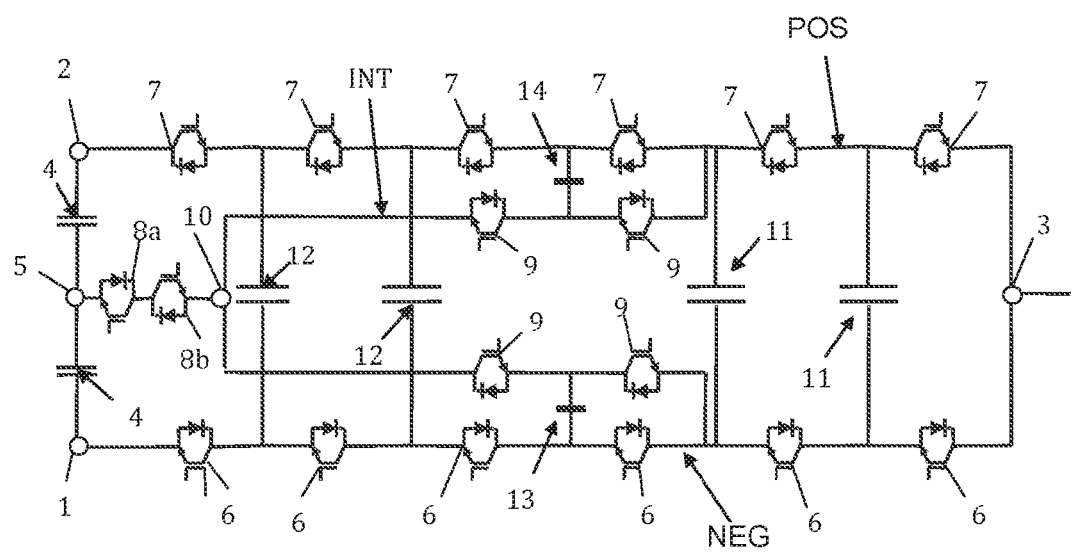

FIGS. 4A and 4B illustrate the embodiments of a power converter with seven output levels. In each of these embodiments, the converter comprises four internal controlled semiconductors -9- connected in series in the internal branch -INT-, an intermediate controlled semiconductor -8- formed by two semiconductors -8a, 8b- with antiparallel diodes and connected in anti-series between the intermediate DC terminal -10- and the intermediate DC voltage terminal -5-, six first external controlled semiconductors -6- connected in series in the negative branch NEG and six second external controlled semiconductors -7- connected in series in the positive branch -POS-, as well as two high-current DC capacitors -11- connected between the positive branch -POS- and the negative branch -NEG-.

In the embodiment shown in FIG. 4A, the power converter has three high-frequency low-current capacitors -12- connected between the positive branch -POS- and the negative branch -NEG-, whereas in the embodiment shown in FIG. 4B, there are only two high-frequency low-current capacitors -12- connected between the positive branch -POS- and the negative branch -NEG-, the high-frequency capacitor closest to the AC voltage terminal being replaced with a first complementary high-frequency low-current capacitor -13- connected between the negative branch -NEG- and the internal branch -INT- and a second complementary high-frequency low-current capacitor -14- connected between the positive branch -POS- and the internal branch -INT-. These complementary high-frequency low-current capacitors -13, 14- are, therefore, interconnected between the internal branch -INT- and said positive -POS- and negative -NEG- branches, between the high-frequency low-current capacitor -12- closest to the AC voltage terminal -3- and the high-current DC capacitor -11- closest to the DC voltage terminals -1, 2, 5-, whereas the internal branch -INT- is connected to said positive -POS- and negative -NEG- branches between the complementary high-frequency low-current capacitors -13, 14- and the high-current DC capacitor -11- closest to the DC voltage terminals -1, 2, 5-.

In any one of the embodiments described above, the power converter can be controlled by a pulse-width modulation control system to synthesize an alternating voltage in the AC terminal -3-, and by a voltage stabilizing system using redundancies available in output voltage vectors of the converter to keep the voltage of the intermediate DC terminal -10- and the voltage of each of the high-current DC capacitors -11- stable.

The invention claimed is:

1. A multilevel electronic DC/AC or AC/DC power converter for n output voltage levels comprising:
   a positive branch (POS) with a positive DC voltage terminal (2), a negative branch (NEG) with a negative DC voltage terminal (1), and an AC voltage terminal (3) connected to the positive branch (POS) and to the negative branch (NEG);
   at least two DC bus capacitors (4) interconnected between the positive DC voltage terminal (2) and the negative DC voltage terminal (1), and an intermediate DC voltage terminal (5) connected between the two DC bus capacitors (4);

a plurality of first external controlled semiconductors (6) with antiparallel diodes connected in series in the negative branch (NEG) between the negative DC voltage terminal (1) and the AC voltage terminal (3), and a plurality of second external controlled semiconductors (7) with antiparallel diodes connected in series in the positive branch (POS) between the positive DC voltage terminal (2) and the AC voltage terminal (3);

characterized in that it comprises at least two first external controlled semiconductors (6) and at last two second external controlled semiconductors (7);

at least one high-current DC capacitor (11) connected between the positive branch (POS) and the negative branch (NEG), and at least two high-frequency and low- current capacitors (12) connected between the positive branch (POS) and the negative branch (NEG) where high-frequency and low-current capacitors (12) only conduct current during the actuation of the switches in order to reduce the overvoltages that appear in the semiconductors during commutation;

an internal branch (INT) connected in parallel with each high-current DC capacitor (11) comprising at least two internal controlled semiconductors (9) with antiparallel diodes connected in series and to an intermediate terminal (10);

at least one intermediate controlled semiconductor (8) formed by two controlled semiconductors (8a, 8b) with antiparallel diodes and connected in anti-series, connected between the intermediate DC voltage terminal (5) and the intermediate terminal (10) of the internal branch (INT).

2. The multilevel electronic converter according to claim 1,
comprising n−1 first external controlled semiconductors (6) and n−1 second external controlled semiconductors (7).

3. The multilevel electronic converter according to claim 2, wherein the internal branch (INT) connected in parallel with the at least one high-current DC capacitor (11) comprises n−3 internal controlled semiconductors (9) with antiparallel diodes connected in series between them and to the intermediate terminal (10).

4. The Multilevel electronic converter according to claim 1, wherein the internal branch (INT) connected in parallel with the at least one high-current DC capacitor (11) comprises n−3 internal controlled semiconductors (9) with antiparallel diodes connected in series between them and to the intermediate terminal (10).

5. The multilevel electronic converter according to claim 1, further comprising at least one first complementary high-frequency and low-current capacitor (13) connected between the negative branch (NEG) and the internal branch (INT), and at least one second complementary high-frequency and low-current capacitor (14) connected between the positive branch (POS) and the internal branch (INT).

6. The multilevel electronic converter according to claim 5, wherein the first and second complementary high-frequency and low-current capacitors (13, 14) are interconnected between the internal branch (INT) and said negative (NEG) and positive (POS) branches between one of the at least two high-frequency and low-current capacitors (12) and the at least one high-current DC capacitor (11).

7. The multilevel electronic converter according to claim 1, wherein the internal branch (INT) is connected to said negative (NEG) and positive (POS) branches between the high-frequency and low-current capacitor (12) from the at least two high-frequency and low-current capacitors (12) closest to the AC voltage terminal (3) and the at least one high-current DC capacitor (11) closest to the positive, negative and intermediate DC voltage terminals (1, 2, 5).

8. The multilevel electronic converter according to claim 1, wherein the at least two first external controlled semiconductors (6), the at least two second external controlled semiconductors (7) and the at least two internal controlled semiconductors (9) are selected from IGBT transistors, IGCT thyristors, IEGT transistors, GTO thyristors and combinations thereof.

9. The multilevel electronic converter according to claim 1, wherein each of the at least two high-frequency and low-current capacitors (12) is connected to the negative branch (NEG) between two first external controlled semiconductors (6) and to the positive branch (POS) between two second external controlled semiconductors (7);
wherein the at least two high-frequency and low-current capacitors (12) are connected consecutively;
and wherein the at least one high-current DC capacitor (11) is connected to the negative branch (NEG) between two first external controlled semiconductors (6) and to the positive branch (POS) between two second external controlled semiconductors (7).

10. The multilevel electronic converter according to claim 1, comprising five output levels and further comprising:
two internal controlled semiconductors (9) connected in series in the internal branch (INT);
one intermediate controlled semiconductor (8) formed by two semiconductors (8a, 8b) with antiparallel diodes connected in anti-series between the intermediate terminal (10) and the intermediate DC voltage terminal (5);
four first external controlled semiconductors (6) connected in series in the negative branch (NEG) and four second external controlled semiconductors (7) connected in series in the positive branch (POS);
one high-current DC capacitor (11) connected between the positive branch (POS) and the negative branch (NEG);
two high-frequency and low-current capacitors (12) connected between the positive branch (POS) and the negative branch (NEG).

11. The multilevel electronic converter according to claim 1, comprising seven output levels and further comprising:
four internal controlled semiconductors (9) connected in series in the internal branch (INT);
one intermediate controlled semiconductor (8) formed by two semiconductors (8a, 8b) with antiparallel diodes and connected in anti-series between the intermediate terminal (10) and the intermediate DC voltage terminal (5);
six first external controlled semiconductors (6) connected in series in the negative branch (NEG) and six second external controlled semiconductors (7) connected in series in the positive branch (POS);
two high-current DC capacitors (11) connected between the positive branch (POS) and the negative branch (NEG);
three high-frequency and low-current capacitors (12) connected between the positive branch (POS) and the negative branch (NEG).

12. The multilevel electronic converter according to claim 1, comprising seven output levels and further comprising:

four internal controlled semiconductors (9) connected in series in the internal branch (INT);

one intermediate controlled semiconductor (8) formed by two semiconductors (8a, 8b) with antiparallel diodes and connected in anti-series between the intermediate terminal (10) and the intermediate DC voltage terminal (5);

six first external controlled semiconductors (6) connected in series in the negative branch (NEG) and six second external controlled semiconductors (7) connected in series in the positive branch (POS);

two high-current DC capacitors (11) connected between the positive branch (POS) and the negative branch (NEG);

two high-frequency and low-current capacitors (12) connected between the positive branch (POS) and the negative branch (NEG);

a first complementary high-frequency low-current capacitor (13) connected between the negative branch (NEG) and the internal branch (INT), and a second complementary high-frequency low-current capacitor (14) connected between the positive branch (POS) and the internal branch (INT).

13. The multilevel electronic converter according to claim 12, wherein the first and second complementary high-frequency and low-current capacitors (13, 14) are interconnected between the internal branch (INT) and said negative (NEG) and positive (POS) branches between the high-frequency and low-current capacitor (12) from the two high-frequency and low-current capacitors (12) closest to the AC voltage terminal (3) and the high-current DC capacitor (11) from the two high-current DC capacitors (11) closest to the positive, negative and intermediate DC voltage terminals (1, 2, 5);

and wherein the internal branch (INT) is connected to said negative (NEG) and positive (POS) branches between the first and second complementary high-frequency and low-current capacitors (13, 14) and the high-current DC capacitor (11) from the two high-current DC capacitors (11) closest to the positive, negative and intermediate DC voltage terminals (1, 2, 5).

* * * * *